(12) United States Patent
Fulk et al.

(10) Patent No.: US 6,338,749 B1
(45) Date of Patent: Jan. 15, 2002

(54) SYSTEM AND METHOD FOR DEGASSING A MATERIAL AND A MATERIAL DISTRIBUTOR FOR USE WHEN DEGASSING A MATERIAL

(75) Inventors: Raymond Keith Fulk, Pendleton; Carleton L. Berk, Indianapolis, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/576,733

(22) Filed: May 23, 2000

(51) Int. Cl.[7] ............................................. B01D 19/00
(52) U.S. Cl. .......................... 95/266; 95/260; 96/193; 96/194; 96/197; 96/204; 96/220; 96/416
(58) Field of Search ..................... 95/260, 262, 266; 96/155, 193, 194, 195, 197, 198, 204, 206, 220, 322, 323, 324, 325, 326, 327, 328, 414, 415, 416; 210/188; 261/103, 106, 112.1, DIG. 44; 239/499, 589, 602; 123/621

(56) References Cited

U.S. PATENT DOCUMENTS

| | | | | |
|---|---|---|---|---|
| 2,773,555 A | * | 12/1956 | Pape ............................ | 96/198 |
| 3,590,916 A | * | 7/1971 | Mutzenberg et al. ......... | 165/94 |
| 3,638,760 A | * | 2/1972 | Lamm ........................ | 184/7.63 |
| 4,298,041 A | * | 11/1981 | Lagana et al. ............... | 141/392 |
| 4,299,602 A | * | 11/1981 | Cordier et al. ............... | 96/325 |
| 4,338,100 A | * | 7/1982 | Wersosky et al. ............ | 95/260 |
| 4,358,296 A | * | 11/1982 | Notardonato et al. ........ | 96/202 |
| 4,392,874 A | * | 7/1983 | Yamauchi .................... | 96/200 |
| 4,661,612 A | * | 4/1987 | George et al. ............... | 556/450 |
| 4,867,775 A | * | 9/1989 | Cain et al. .................... | 65/382 |

* cited by examiner

*Primary Examiner*—Duane Smith
*Assistant Examiner*—Jason M. Greene
(74) *Attorney, Agent, or Firm*—Margaret A. Dobrowitsky

(57) ABSTRACT

A system is provided for de-gassing a material. The system includes a vessel and a material distributor. The vessel has an internal chamber in which a vacuum can be maintained. The material distributor is located inside the internal chamber and is adapted to distribute the material to be degassed as a thin film along at least one wall of the vessel in such a way that exposure of the thin film to vacuum within the internal chamber causes entrained air or other gasses from the material to be withdrawn from the thin film. Also provided is a method for degassing a material. Preferably, a material distributor is inserted into a vessel where degassing of a material is to be performed. The material distributor can comprise an inlet for the material to be degassed, a scaling lip, a film-forming lip, and a material distribution cavity. The sealing lip is adapted to sealingly engage at least one wall of the vessel. The film-forming lip is spaced apart from the sealing lip. The material distribution cavity is defined between the sealing and film-forming lips, and is in fluid communication with the inlet. When the sealing lip sealingly engages the wall(s) of the vessel, the film-forming lip is positioned with respect to the wall(s) in such a way that the material to be degassed exits the material distribution cavity by passing as a thin film between the film-forming lip and the wall(s).

31 Claims, 3 Drawing Sheets

SYSTEM AND METHOD FOR DEGASSING A MATERIAL AND A MATERIAL DISTRIBUTOR FOR USE WHEN DEGASSING A MATERIAL

BACKGROUND OF THE INVENTION

1. Field of the Invention

The present invention relates to a material distributor, as well as a system and method for de-gassing a material by distributing the material as a thin film onto a wall of a chamber, while a vacuum (i.e., a reduced absolute pressure) is maintained in the chamber.

2. Discussion of the Related Art

There are several manufacturing processes that require degassing of a fluid (i.e., the removal of entrained air or other gasses from the fluid). One such manufacturing process relates to ignition coils. It is known to encase an ignition coil in a 2-part silicone material. Proper operation of the coil, however, depends to a large extent on the vacuum integrity of the silicone material. It is therefore very important to remove the entrained air or other gasses from the silicone material.

The removal of entrained air or other gasses, in the past, has been performed using mechanically active devices (i.e., devices having moving pairs). Examples of such devices include slinger plates, conical sections, and/or motorized Archimedes screws. These devices, however, can be relatively complex and expensive to implement. Often they are provided in such a way that the material being degassed cannot be viewed, making it difficult to visually verify the performance of the degassing function. At least some of these mechanically active devices require frequent maintenance and are potentially subject to mechanical failure. Some also are difficult to implement in such a way that the material is degassed at substantially the same rate as it is used. The de-gassing therefore is often performed in batches, rather than "on-the-fly."

There is consequently a need for a more passive way and system of degassing a fluid material (i.e. a system and method that does not require moving parts). Since it is desirable to degas the material "on the fly" at a rate that is substantially equal to the rate at which the material is being used, there is need in the art for a degassing system and method that does not require batch-based preformance of the degassing process. The need for a de-gassing method and system also extends to one that does not require expensive parts, frequent maintenance, and/or comber plicated moving parts.

Also, inasmuch as it is often desirable to view the material being degassed so that the degassing effect can be visually verified, there is a need in the art for a degassing system and method that can be implemented in a visually transparent vessel or a vessel having visually transparent parts.

SUMMARY OF THE INVENTION

It is a primary object of the present invention to overcome at least one of the foregoing problems and/or to satisfy at least one of the aforementioned needs by providing a more practical, less expensive, more reliable, visually verifiable, more passive, and/or less complicated system and/or method for degassing a fluid material , and/or a fluid distributor for use in a material degassing process.

To a achieve this and other objects and advantages, the present invention provides a system for de-gassing a material. The system comprises a vessel and a material distributor. The vessel has an internal chamber in which a vacuum can be maintained. The material distributor is located inside the internal chamber and is adapted to distribute the material to be degassed as a thin film along at least one wall of the vessel in such a way that exposure of the thin film to vacuum within the internal chamber causes entrained air or other gasses from the material to be withdrawn from the thin film.

Also provided by the present invention is a method for degassing a material. The method comprises the steps of distributing a material as a thin film onto at least one wall of a chamber, and maintaining a vacuum in the chamber so that exposure of the thin film to the vacuum causes entrained air or other gasses from the material to be withdrawn from the thin film.

According to another aspect of the present invention, a material distributor can be provided for insertion into a vessel where degassing of a material is to be performed. The material distributor comprises an inlet for the material to be degassed, a sealing lip, a film-forming lip, and a material distribution cavity. The sealing lip is adapted to sealingly engage at least one wall of the vessel. The film-forming lip is spaced apart from the scaling lip. The material distribution cavity is defined between the sealing lip and the film-forming lip, and is in fluid communication with the inlet. The film-forming lip is positioned with respect to the scaling lip so that when the sealing lip sealingly engages wall(s) of the vessel, the film-forming lip is positioned with respect to the wall(s) in such a way that the material to be degassed exits the material distribution cavity by passing as a thin film between the film-forming lip and the wall(s).

Still other objects, advantages, and features of the present invention will become more readily apparent when reference is made to the accompanying drawing and the associated description contained herein.

DESCRIPTION OF PREFERRED EMBODIMENTS

Figure 1:
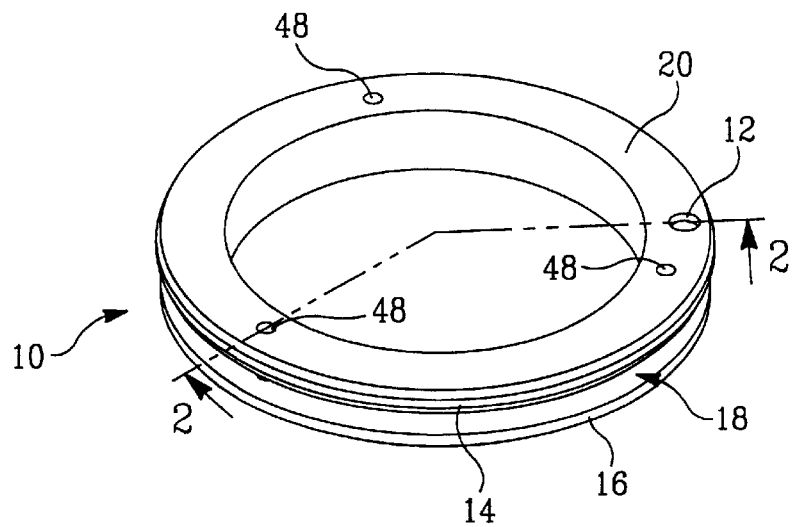
FIG. 1 is a perspective view of a material distributor according to a preferred embodiment of the present invention.
Figure 2:
FIG. 2 is a cross-sectional view of the material distributor shown in FIG. 1.
Figure 3:
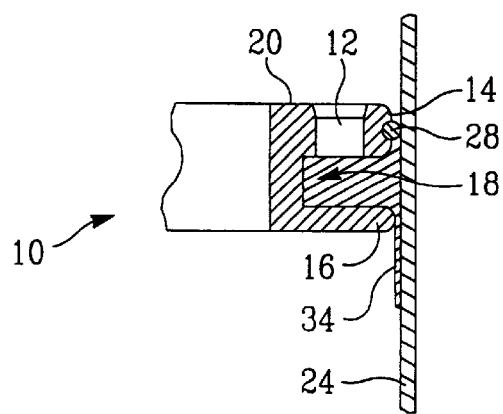
FIG. 3 is an enlarged cross-sectional view of the material distributor shown in FIGS. 1 and 2, taken from the right side of FIG. 2.

FIGS. 1–3 illustrate a material distributor 10 according to a preferred embodiment of the present invention. The material distributor 10 can be used to facilitate degassing of a fluid material. The material distributor 10 includes an inlet 12, a scaling lip 14, a film-forming lip 16, and a material distribution cavity 18. The inlet 12 preferably is defined through a top surface 20 of the material distributor 10. The sealing lip 14 and the film-forming lip 16 preferably extend radially out from the material distributor 10.

The sealing lip 14 is adapted to sealingly engage at least one wall 24 of a vessel 26. This is perhaps best illustrated in FIGS. 3 and 4. Preferably, the scaling lip 14 includes a resilient sealing member 28 adapted to sealingly engage the vessel's wall(s) 24. The exemplary sealing member 28 is a conventional O-ring. The O-ring can be made of rubber or any other suitable resilient material. Preferably, the rest of the sealing lip 14 (i.e., the portion of the sealing lip 14 other than the resilient sealing member 28 or O-ring) has a notch 30 for the resilient sealing member 28 and is formed integrally with the film-forming lip 16. The material distributor 10 thereby is provided with a substantially unitary (i.e. one-piece) structure. This unitary structure can be formed from aluminum or other suitably rigid material(s). Notably, the substantially unitary structure of the material distributor is free of moving parts.

The film-forming lip 16 is axially spaced apart from the sealing lip 14. Defined between the sealing lip 14 and the film-forming lip 16 is the material distribution cavity 18. The distribution cavity 18 is in fluid communication with the inlet 12. When the sealing lip 14 engages the vessel's wall(s) 24, the material to be degassed can be injected through the inlet 12 into the distribution cavity 18 so that it uniformly fills the entire distribution cavity 18.

Preferably, the film-forming lip 16 is positioned with respect to the sealing lip 14 so that, when the sealing lip 14 sealingly engages the wall(s) 24 of the vessel 26, the film-forming lip 16 is positioned with respect to the wall(s) 24 in such a way that any material to be degassed exits the material distribution cavity 18 by passing as a thin film 34 between the film-forming lip 16 and vessel's wall(s) 24. Preferably, this is achieved by arranging the film-forming lip 16 so that it remains spaced apart from the wall(s) 24 of the vessel 26 by a distance corresponding to the desired thickness of the thin film 34 when the sealing lip 14 engages the wall(s) 24. In the exemplary embodiment, the resilient sealing member 28 provides this spacing. Other spacing arrangements, however, can be used.

Figure 4:
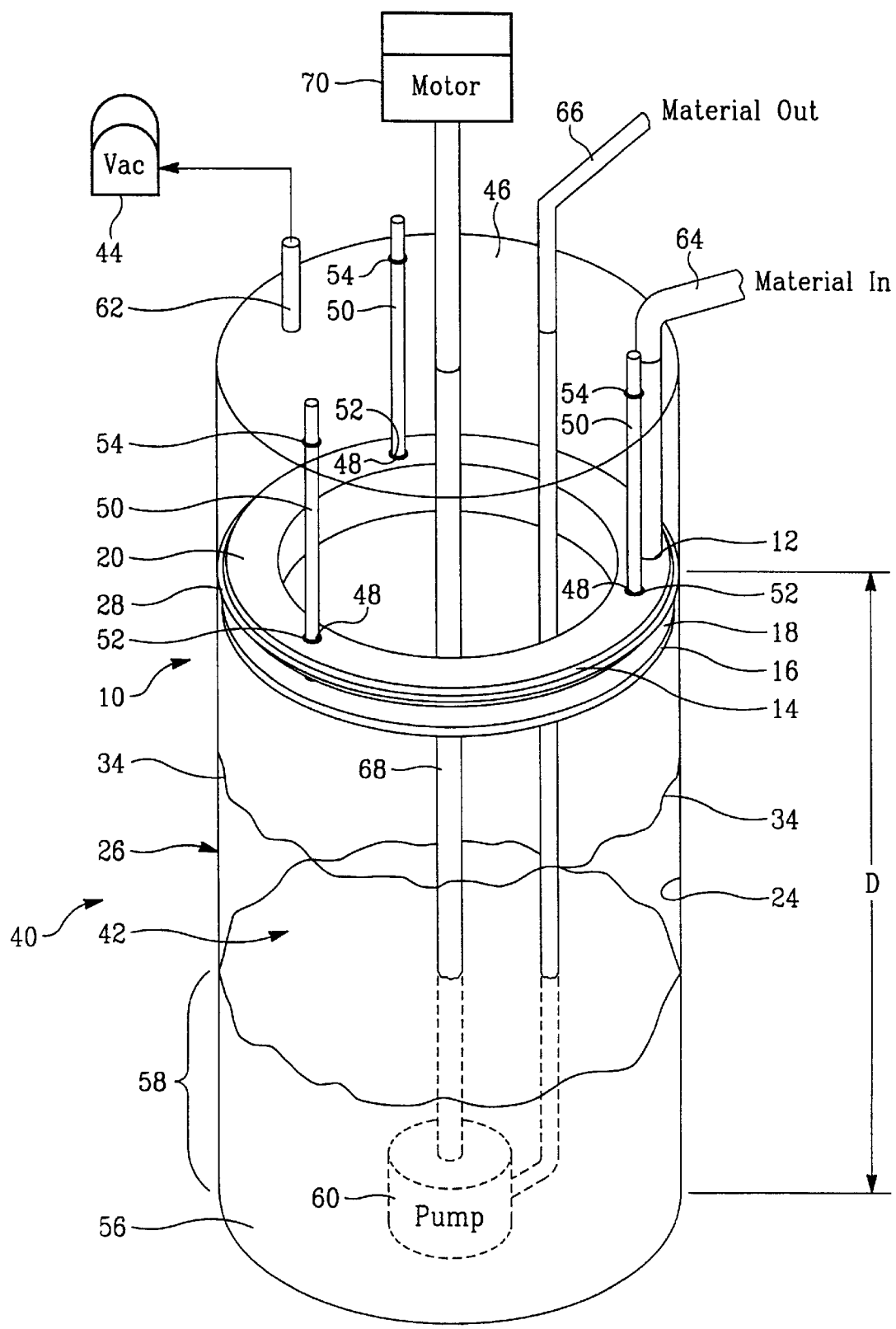
FIG. 4 is a partially perspective, partially schematic view of a system for degassing a material according to a preferred embodiment of the present invention.

As illustrated in FIG. 4, the material distributor 10 preferably is used in a cylindrical vessel 26 and can be provided with an annular configuration. The distribution cavity 18, in this regard, can be ring-shaped to distribute the material as a thin film 34 along a substantially vertical, inside circumferential wall 24 of the vessel 26.

The present invention also provides a system 40 for degassing a material. According to a preferred embodiment of the invention, the system 40 includes the material distributor 10 and the vessel 26 described above. The vessel 26 has an internal chamber 42 in which a vacuum can be maintained. The vacuum can be maintained by any suitable vacuum-generating device 44.

The material distributor 10 is located inside the internal chamber 42 of the vessel 26 and is adapted to distribute the material to be degassed as a thin film 34 along at least one wall 24 of the vessel 26 in such a way that exposure of the thin film 34 to the vacuum within the internal chamber 42 causes entrained air or other gasses from the material to be withdrawn from the thin film 34.

Preferably, the vessel 26 includes at least one substantially transparent portion through which the thin film 34 can be observed from outside of the vessel 26. The substantially transparent portion preferably includes the wall(s) 24 along which the thin film 34 of material is formed. According to a most preferred embodiment, the vessel 26 is made of acrylic and therefore is transparent. The vessel 26 can be provided with a cap 46 that seals the top of the vessel 26. Preferably, the cap 46 is clamped onto the top of the vessel 26.

In order to facilitate mounting of the material distributor 10 in spaced relation to the top of the vessel 26, the material distributor 10 can be provided with suitable mounting holes 48 (shown in FIGS. 1 and 2). In the exemplary embodiment of FIGS. 1–4, three holes 48 are disposed 120 degrees apart from one another around the material distributor 10. Support legs 50 can be provided with one end 52 of each support leg 50 being secured to the material distributor 10 via the mounting holes 48, and another end 54 being secured to the cap 46 of the vessel 26. In this manner, the material distributor 10 can be held securely in place within the vessel 26.

Preferably, as shown in FIG. 4, the support legs 50 hold the material distributor 10 a predetermined distance D from the bottom 56 of the vessel 26. For each type of material to be degassed, the total throughput, cylinder height (of vessel 26), film thickness, and the space between the film-forming lip 16 and the wall 24 of the vessel 26 can be established in accordance calculations that are based on the requisite retention time (how long the material must remain on the wall(s) 24 in thin-film form) and how thin the film 34 must be, to fully remove the air or other entrained gasses from the material.

An exemplary process of determining the physical dimensions of the material distributor 10 and the vessel 26 will now be described. In the following description, the desired flow rate is denoted as Q (in lph), the desired internal diameter of the vessel is denoted as VESSELID which as an example will be assumed to be equal to 11 inches (or 279.4 mm), the internal diameter of the inlet 12 is denoted as INLETID which as an example is assumed to be 0.19 inch (or 4.826 mm), the outer diameter of the material distributor 10, as measured across the film-forming lip 16, is denoted as DISTRIBUTOROD, the cross-sectional flow area through the inlet 12 is denoted as $A_{inlet}$, the area encompassed by the internal wall 24 of the vessel 26 is denoted as $A_{VESSELID}$, the area encompassed by the circumference of the film-forming lip 16 is denoted as $A_{distributorOD}$, and the radial spacing between the film-forming lip 16 and the wall 24 is denoted as GAP.

Thus, the various areas described above can be determined using the following equations:

$$A_{inlet} = \tfrac{1}{4}\pi(\text{INLETID})^2$$

$$A_{VESSELID} = \tfrac{1}{4}\pi(\text{VESSELID})^2$$

$$A_{distributorOD} = \tfrac{1}{4}\pi(\text{DISTRIBUTOROD})^2$$

It is desirable to have cross-sectional area $A_{inlet}$ of the inlet 12 be equal to the cross sectional area of the space between the film-forming lip 16 and the wall 24, so that the space fills with the material (or liquid) and so that the thin film 34 of material (or liquid) covers the entire inside circumference of the wall 24.

Thus, it is desirable for the following equation to be satisfied:

$$A_{inlet} = A_{VESSELID} - A_{distributorOD}$$

When the foregoing equation is to be satisfied, the outside diameter (distributorOD) of the film-forming lip 16 can be calculated as follows:

$$\tfrac{1}{4}\pi(\text{INLETID})^2 = \tfrac{1}{4}\pi(\text{VESSELID})^2 - \tfrac{1}{4}\pi(\text{DISTRIBUTOROD})^2$$

$$\text{DISTRIBUTOROD} = \sqrt{(\text{VESSELID})^2 - (\text{INLETID})^2}$$

$$\text{DISTRIBUTOROD} = \sqrt{(279.400 \text{ mm})^2 - (4.826 \text{ mm})^2}$$

$$\text{DISTRIBUTOROD} = 279.358 \text{ mm}$$

The GAP then can be calculated as half the difference between the inside diameter (VESSELID) of the wall 24 and the outside diameter (distributorOD) of the film-forming lip 16, whereby:

$$GAP = 1/2[VESSELID - distributorOD]$$
$$= 0.50[279.400 - 279.358]$$
$$GAP = 0.042 \text{ mm}$$

Also, the linear velocity V, of the material (or liquid) through the gap (GAP) is the volumetric flow rate, Q, divided by the area of the gap, whereby:

$$V = Q/A$$
$$V(cm/sec) = Q(lph) \times (1000 \text{ cc/l})/\tfrac{1}{4}\pi(0.4826 \text{ cm})^2 \times (3600 \text{ sec/h})$$
$$V = 1.519 \text{ Q}$$

As an example, therefore, if the incoming flow rate is 10 lph, then the velocity of the fluid on the vessel wall 24 will be 15.2 cm/sec. If the required vacuum exposure time for thin film 34 to be sufficiently de-gassed is 20 seconds, for example, then the vessel 26 should be provided with a falling height of 15.2 cm/sec×20 sec=30.4 cm, the falling height being the distance along the wall 24 through which the material is allowed to fall in its thin film form.

The material distributor 10 has applications in connection with many different liquids that require removal of dissolved and/or entrained air. The liquid viscosity can vary from 1 cps to over 100,000 cps. Any liquid that will flow under gravity can be processed using the material distributor 10. If the material includes a filler, then the material distributor 10 can be used in conjunction with an agitated form of vessel 26. If the material is chemically aggressive, the materials defining the vessel 26 and the material distributor 10 should be made compatible with the chemically aggressive material.

At the bottom 56 of the vessel 26, there is a material collection region 58 into which the thin film 34 of material from the material distributor 10 flows after being degassed along the wall(s) 24 of the vessel 26. A material pump 60 can be submerged in the material collection region 58 to facilitate removal of the degassed material from the material collection region 58 of the vessel 26. The material pump 60 preferably is a metering pump that facilitates removal of the degassed material in well-regulated amounts.

The cap 46 preferably has suitably sealed passages and/or fittings through which respective conduits can gain access to the contents of the vessel 26. Exemplary conduits include a vacuum line 62 connected to a vacuum generating device 44, a material feed tube 64 through which the material to be degassed is fed into the inlet 12 of the material distributor 10, a material discharge tube 66 through which degassed material is discharged, and a pump drive tube 68 through which an output shaft of an external motor 70 can be mechanically connected to a material pump 60 inside the vessel 26.

Figure 5:
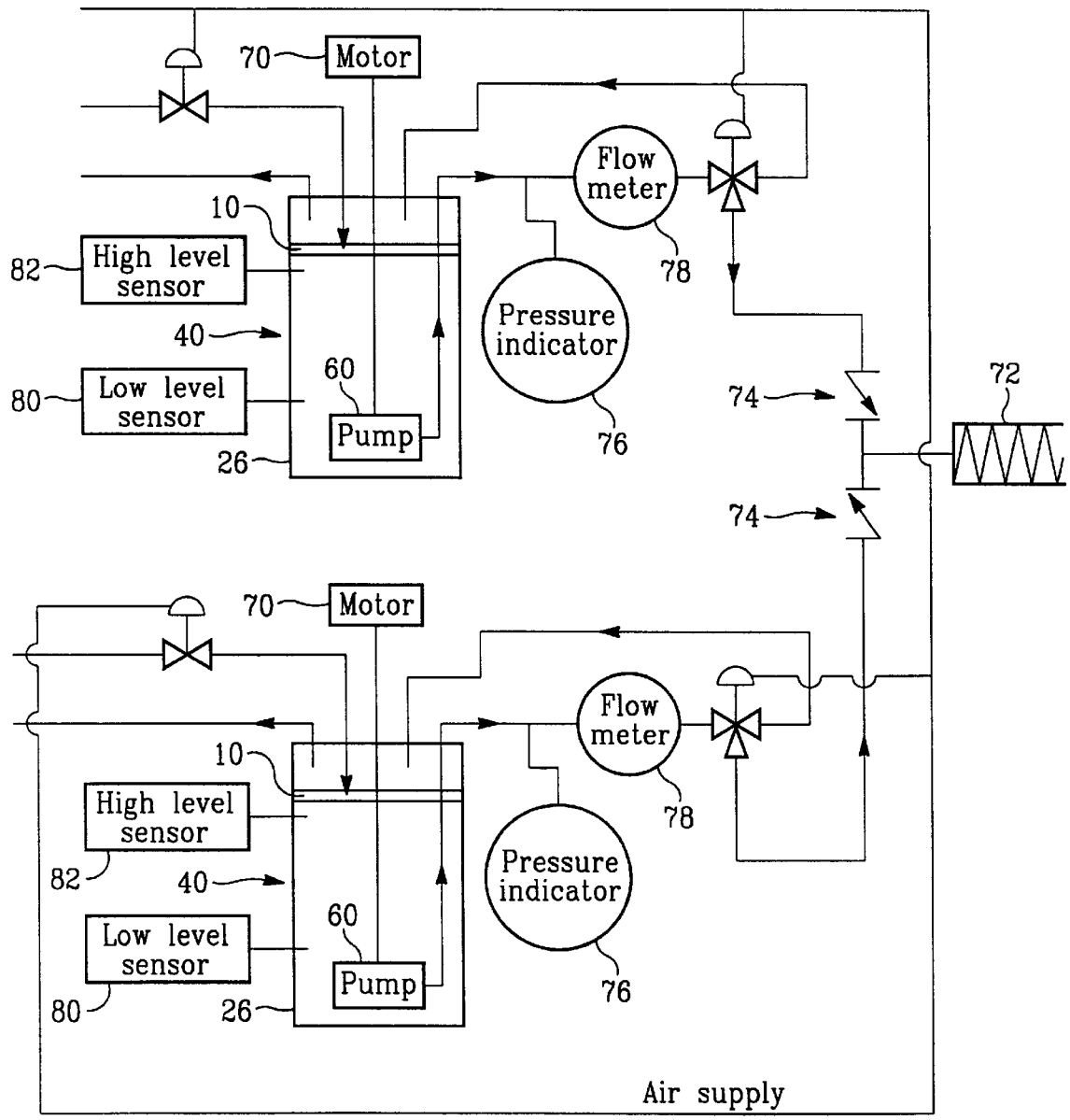
FIG. 5 is a schematic illustration of a tandem system for degassing two materials according to a preferred embodiment of the present invention.

As shown in FIG. 5, the exemplary system can be duplicated so that two such systems 40 exist in parallel, one for one type of material in need of degassing and the other for another type of material in need of degassing, both of which materials are to be combined in a static mixer 72. Examples of such materials are the two-part silicone materials that are used to encapsulate ignition coils. Redundancy also (or alternatively) can be provided by arranging individual ones of the foregoing systems 40 in series so that the output of degassed material from the first system is subjected to a further degassing process in a downstream system. Such redundancy, however, is not believed to be necessary in view of the reliability of each such system 40.

While the foregoing material distributor 10 and system 40 for degassing a material can be used in connection with other fluid materials in need of degassing (especially low-filler-content liquid materials), a preferred use of the foregoing material distributor 10 and system 40 for degassing a material arises in the context of ignition coil encapsulation. One of the systems 40 in FIG. 5 can provide degassing of one part of a two-part silicone encapsulation material, while the other system 40 provides degassing of the other part. After degassing, each part is pumped by pumps 60 through a respective check valve 74 and into the static mixer 72 where the two parts are mixed together in a manlier well known in the art. A pressure indicator 76 and flow meter 78 can be disposed between each pump 60 and its associated check valve 74. In addition, each vessel 26 can be provided with a low fluid level sensor 80 and a high fluid level sensor 82. The sensors 80,82 can be connected to suitable indicators that indicate when a low or high fluid level condition exists.

The present invention also provides a method for degassing a material. The method comprises the steps of distributing a material as a thin film 34 onto at least one wall 24 of a chamber 42, and maintaining a vacuum in the chamber 42 so that exposure of the thin film 34 to the vacuum causes entrained air or other gasses from the material to be withdrawn from the thin film 34.

Preferably, the step of distributing the material is performed passively using a material distributor that is free of moving parts (e.g., the exemplary material distributor 10 described above). The step of distributing the material, as indicated above, can be performed on a wall 24 (or walls) that is (are) substantially transparent so that the thin film 34 can be observed from outside of the chamber 42. This provides a convenient way of verifying that the entrained air or other gasses have been removed from the material.

The step of distributing the material includes the steps of feeding the material to be degassed into the inlet (e.g., inlet 12) of the material distributor 10 so that the material fills the material distribution cavity 18, and discharging the material in thin-film-form, from the material distribution cavity 18 through a space between the wall(s) 24 and the film-forming lip 16 of the material distributor 10, this space being dimensionally configured to provide the thin film 34 with a desired thickness. The desired thickness can be determined based on how thin the film 34 must be in order to ensure that the material is completely degassed.

Preferably, the thin film 34 is distributed on a substantially vertical wall 24 (or walls), and the step of discharging the material is performed downwardly along the wall(s) 24. The material then is allowed to flow as a thin film 34 downwardly along the wall(s) 24 while being exposed to a vacuum. As a result, the material becomes degassed. The material preferably is collected after degassing (e.g., at the bottom of a vessel in which the degassing occurs). The material then can be pumped to a location where the degassed material is used.

While the method of the present invention can be practiced on many different materials (especially low-filler-content liquids), it preferably is practiced on each part of a two-part silicone substance before the parts are mixed together, and/or as a step in a process of encapsulating an ignition coil or other coil in the two-part silicone. In this regard, the steps of distributing the material and maintaining the vacuum can be performed in each of two separate chambers 26 (e.g., as shown in FIG. 5) using different ones of the materials to be degassed, and the method can further comprise the step of mixing the different materials to provide a degassed mixture of materials.

As indicated above, the different materials can be constituent parts of an encapsulating substance, and the method can further comprise the step of applying the degassed mixture of materials to an ignition coil assembly to thereby encapsulate parts of the ignition coil assembly.

Notably, the exemplary material distributor 10 is passive and has no moving parts. It therefore advantageously avoids the need for frequent maintenance and is usually not subject to mechanical failure. The foregoing system also advantageously can be implemented so that the material is degassed at substantially the same rate as it is used. The degassing therefore need not be performed in batches, and instead can be performed "on-the-fly." It also can be performed continuously, without interruption (e.g., 24 hours per day/7 days per week). Since the material distributor 10 can be provided as a substantially unitary structure, it obviates the need for expensive parts, complex manufacturing and assembly procedures, frequent maintenance, and/or complicated moving parts.

While the present invention has been described with reference to certain preferred embodiments and implementations, it is understood that various modifications and variations will no doubt occur to those skilled in the art to which this invention pertains. These and all other such variations, which basically rely on the teachings through which this disclosure has advanced the art, are properly considered within the scope of this invention.

What is claimed is:

1. A system for de-gassing a material, comprising:
    a vessel having an internal chamber in which a vacuum can be maintained; and
    a material distributor located inside the internal chamber and adapted to distribute the material to be degassed as a thin film along at least one wall of the vessel in such a way that exposure of the thin film to vacuum within the internal chamber causes entrained air or other gasses from the material to be withdrawn from the thin film, said material distributor having;
        a sealing lip sealingly engaging the at least one wall of the vessel;
        and a film forming lip adjacent said sealing lip; and
        a space between said film forming lip and said sealing lip, said space being in communication with said material wherein when said material is forced to flow between said sealing lip and said film forming lip said thin film is deposited on said at least one wall.

2. The system of claim 1, wherein said vessel includes at least one substantially transparent portion through which the thin film can be observed from outside of the vessel.

3. The system of claim 1, wherein said at least one wall of the vessel is transparent so that the thin film can be observed from outside of the vessel.

4. A system for de-gassing a material, comprising:
    a vessel having an internal chamber in which a vacuum can be maintained; and
    a material distributor located inside the internal chamber and adapted to distribute the material to be degassed as a thin film along at least one wall of the vessel in such a way that exposure of the thin film to vacuum within the internal chamber causes entrained air or other gasses from the material to be withdrawn from the thin film wherein said material distributor comprises:
        an inlet for the material to be degassed;
        a sealing lip adapted to sealingly engage said at least one wall of the vessel;
        a film-forming lip spaced apart from the sealing lip; and
        a material distribution cavity defined between the sealing lip and the film-forming lip, the material distribution cavity being in fluid communication with the inlet,
        said film-forming lip being positioned with respect to the sealing lip so that when the sealing lip sealingly engages said at least one wall of the vessel, the film-forming lip is positioned with respect to said at least one wall in such a way that the material to be degassed exits the material distribution cavity by passing as said thin film between the film-forming lip and said at least one wall.

5. The system of claim 4, wherein said film-forming lip is positioned with respect to the scaling lip in such a way that, when said sealing lip engages said at least one wall, said film-forming lip remains spaced apart from said at least one wall by a distance corresponding to a desired thickness of said thin film.

6. The system of claim 5, wherein said sealing lip includes a resilient sealing member adapted to sealingly engage said at least one wall.

7. The system of claim 4, wherein said vessel is substantially cylindrical and said at least one wall is a substantially vertical, inside circumferential wall of the vessel.

8. The system of claim 7, wherein said material distributor is annular and said material distribution cavity is ring-shaped to distribute said material as said thin film along the substantially vertical, inside circumferential wall of the vessel.

9. The system of claim 4, wherein said sealing lip includes a resilient scaling member adapted to sealingly engage said at least one wall.

10. The system of claim 1, further comprising a material collection region of said vessel, into which said thin film flows after being degassed.

11. The system of claim 10, further comprising a material pump adapted to pump said material out from the material collection region.

12. The system of claim 1, wherein said vessel is substantially cylindrical and said at least one wall is a substantially vertical, inside circumferential wall of the vessel.

13. A system for de-gassing a material, comprising:
    a vessel having an internal chamber in which a vacuum can be maintained; and
    a material distributor located inside the internal chamber and adapted to distribute the material to be degassed as a thin film along at least one wall of the vessel in such a way that exposure of the thin film to vacuum within the internal chamber causes entrained air or other gasses from the material to be withdrawn from the thin film wherein said vessel is substantially cylindrical and said at least one wall is a substantially vertical, inside circumferential wall of the vessel, said inside circumferential wall being transparent so that the thin film can be observed from outside of the vessel;
    wherein said material distributor is annular and comprises:
        an inlet for the material to be degassed;
        a sealing lip adapted to sealingly engage said inside circumferential wall of the vessel;
        a film-forming lip spaced apart from the sealing lip; and
        a material distribution cavity defined between the sealing lip and the film-forming lip, the material distribution cavity being in fluid communication with the inlet; and
    wherein said film-forming lip is positioned with respect to the sealing lip so that when the sealing lip sealingly engages said inside circumferential wall of the vessel, the film-forming lip is positioned with respect to said inside circumferential wall in such a way that the material to be degassed exits the material distribution cavity by passing as said thin film between the film-forming lip and said inside circumferential wall, said material distribution cavity being ring-shaped to distribute said material as said thin film along the substantially vertical, inside circumferential wall of the vessel.

14. The system of claim 13, wherein said film-forming lip is positioned with respect to the sealing lip in such a way that, when said sealing lip engages said inside circumferential wall, said film-forming lip remains spaced apart from said inside circumferential wall by a distance corresponding to a desired thickness of said thin film.

15. The system of claim 13, wherein said sealing lip includes a resilient scaling member adapted to sealingly engage said inside circumferential wall.

16. The system of claim 1, further comprising a vacuum generating device adapted to said internal chamber and adapted to create a vacuum therein.

17. A method for degassing a material, comprising the steps of:
   distributing a material as a thin film onto at least one wall of a chamber; and
   maintaining a vacuum in the chamber so that exposure of the thin film to the vacuum causes entrained air or other gasses from the material to be withdrawn from the thin film, wherein said step of distributing said material is performed using a metrial distributor including;
      a sealing lip sealingly engaging the at least one wall of the chamber; and
      a film forming lip adjacent said sealing lip; and
      a space between said film forming lip and said sealing lip, said space being in communication with said material,
   forcing said material to flow between said sealing lip and said film forming lip to thereby deposit said thin film on said at least one wall.

18. The method of claim 17, wherein said step of distributing the material is performed passively using a material distributor that is free of moving parts.

19. The method of claim 17, further comprising the step of providing said at least one wall using a substantially transparent material so that the thin film can be observed from outside of the chamber.

20. A method for degassing a material, comprising the steps of:
   distributing a material as a thin film onto at least one wall of a chamber; and
   maintaining a vacuum in the chamber so that exposure of the thin film to the vacuum causes entrained air or other gasses from the material to be withdrawn from the thin film wherein said step of distributing the material is performed using a material distributor that comprises:
      an inlet for the material to be degassed,
      a sealing lip that sealingly engages said at least one wall,
      a film-forming lip spaced apart from the sealing lip, and
      a material distribution cavity defined between the sealing lip and the film-forming lip, the material distribution cavity being in fluid communication with the inlet; and
   wherein said step of distributing the material includes the steps of:
      feeding the material to be degassed into the inlet of the material distributor so that the material fills the material distribution cavity; and
      discharging the material as said thin film, from the material distribution cavity through a space between said at least one wall and the film-forming lip, said space being dimensionally configured to provide said thin film with a desired thickness.

21. The method of claim 20, wherein said at least one wall is substantially vertical, and wherein said step of discharging the material is performed downwardly along said at least one wall.

22. The method of claim 17, wherein said step of distributing the material includes the step of allowing the material to flow as said thin film downwardly along said at least one wall while being exposed to said vacuum, whereby said material becomes degassed, and further comprising the step of collecting said material after degassing.

23. The method of claim 17, wherein said step of distributing the material includes the step of allowing the material to flow as said thin film downwardly along said at least one wall while being exposed to said vacuum, whereby said material becomes degassed, and further comprising the step of pumping the material after degassing to a location where degassed material is used.

24. The method of claim 17, wherein said material is a silicone material.

25. The method of claim 17, wherein said steps of distributing the material and maintaining the vacuum are performed in each of two separate chambers using different ones of said material to be degassed, and further comprising the step of mixing said different ones of said material to provide a degassed mixture of materials.

26. The method of claim 25, wherein said different ones of said material are constituent parts of an encapsulating substance, and wherein said method further comprises the step of applying the degassed mixture of materials to an ignition coil assembly to thereby encapsulate parts of the ignition coil assembly.

27. A material distributor for insertion into a vessel where degassing of a material is to be performed, said material distributor comprising:
   an inlet for the material to be degassed;
   a sealing lip adapted to sealingly engage at least one wall of the vessel;
   a film-forming lip spaced apart from the sealing lip; and
   a material distribution cavity defined between the sealing lip and the film-forming lip, the material distribution cavity being in fluid communication with the inlet,
   said film-forming lip being positioned with respect to the sealing lip so that when the sealing lip sealingly engages said at least one wall of the vessel, the film-forming lip is positioned with respect to said at least one wall in such a way that the material to be degassed exits the material distribution cavity by passing as said thin film between the film-forming lip and said at least one wall.

28. The material distributor of claim 27, wherein said film-forming lip is positioned with respect to the sealing lip in such a way that, when said sealing lip engages said at least one wall, said film-forming lip remains spaced apart from said at least one wall by a distance corresponding to a desired thickness of said thin film.

29. The material distributor of claim 28, wherein said sealing lip includes a resilient sealing member adapted to sealingly engage said at least one wall.

30. The material distributor of claim 27, wherein said material distributor is annular and said material distribution cavity is ring-shaped to distribute said material as said thin film along a substantially vertical, inside circumferential wall of the vessel.

31. The material distributor of claim 27, wherein said sealing lip includes a resilient scaling member adapted to sealingly engage said at least one wall.

* * * * *